United States Patent [19]

Vuillamy et al.

[11] Patent Number: 5,404,715
[45] Date of Patent: Apr. 11, 1995

[54] LIQUID PROPELLANT ROCKET ENGINE WITH PARALLEL AUXILIARY FLOW, AND AN INTEGRATED GAS GENERATOR

[75] Inventors: Didier Vuillamy, Quincampoix; Pierre Desclos, Vernon; André Beaurain, Chambly; Jean-Paul Dumont, Rouen; Pierre-André Baudart, Vernon, all of France

[73] Assignee: Societe Europeenne De Propulsion, Suresnes, France

[21] Appl. No.: 163,713

[22] Filed: Dec. 9, 1993

[30] Foreign Application Priority Data

Dec. 9, 1992 [FR] France ................ 92 14852

[51] Int. Cl.⁶ .................. F02K 9/00; F02K 9/42; F02K 9/72
[52] U.S. Cl. ...................... 60/257; 60/258; 60/259
[58] Field of Search .................. 60/257, 258, 259

[56] References Cited

U.S. PATENT DOCUMENTS

| | | | |
|---|---|---|---|
| 3,036,428 | 5/1962 | Chillson | 60/258 |
| 3,286,469 | 11/1966 | Artherton | 60/224 |
| 3,413,810 | 12/1968 | Kaufmann | 60/258 |
| 3,553,964 | 1/1971 | Kircher, III | 60/258 |

Primary Examiner—Richard A. Bertsch
Assistant Examiner—Howard R. Richman
Attorney, Agent, or Firm—Bacon & Thomas

[57] ABSTRACT

The rocket engine is fitted with an injection device comprising a single injection plate having a central portion that defines the end of the burn zone of the combustion chamber and that contains first propellant injectors having a high mixing ratio adapted to the conditions under which hot gases are produced in the burn zone, and a peripheral portion in the form of a ring that defines the end of an annular cavity of a gas generator and that contain second propellant injectors having a low mixing ratio and adapted to the conditions under which hot gases are produced in the gas generator. The gas generator is thus integral with the combustion chamber and the annular cavity of the gas generator is separated from the burn zone of the combustion chamber by a cylindrical wall that extends axially perpendicularly to the injection plate and that is fixed thereto in sealed manner.

16 Claims, 3 Drawing Sheets

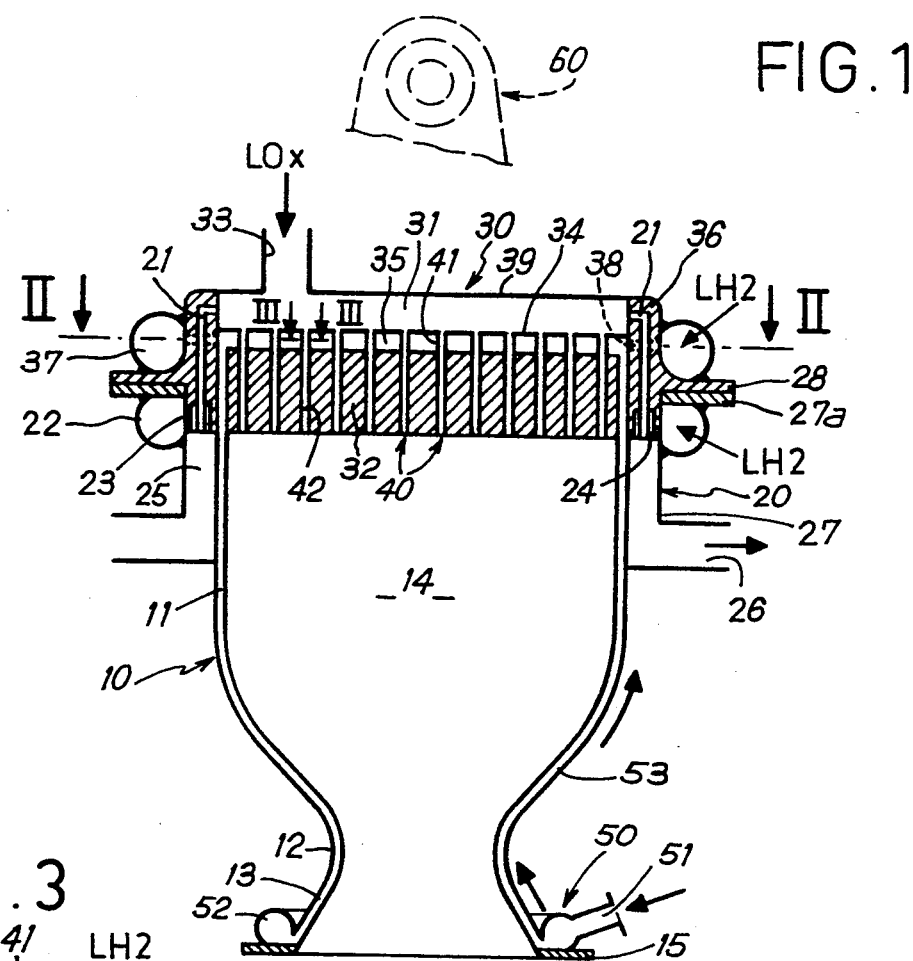
FIG. 1
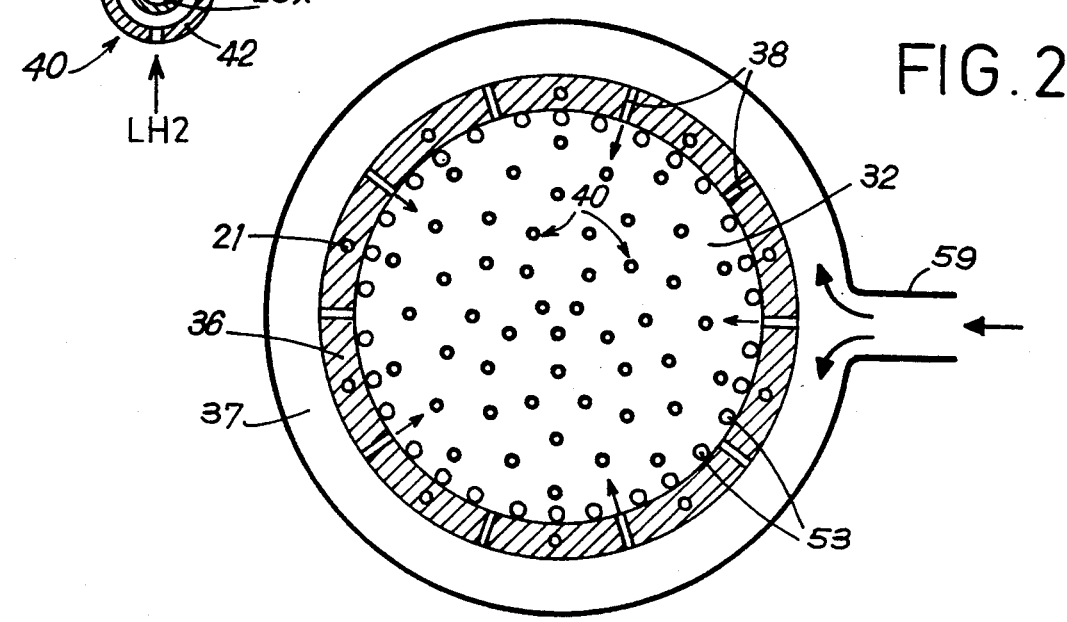
FIG. 3
FIG. 2

PRIOR ART FIG. 6
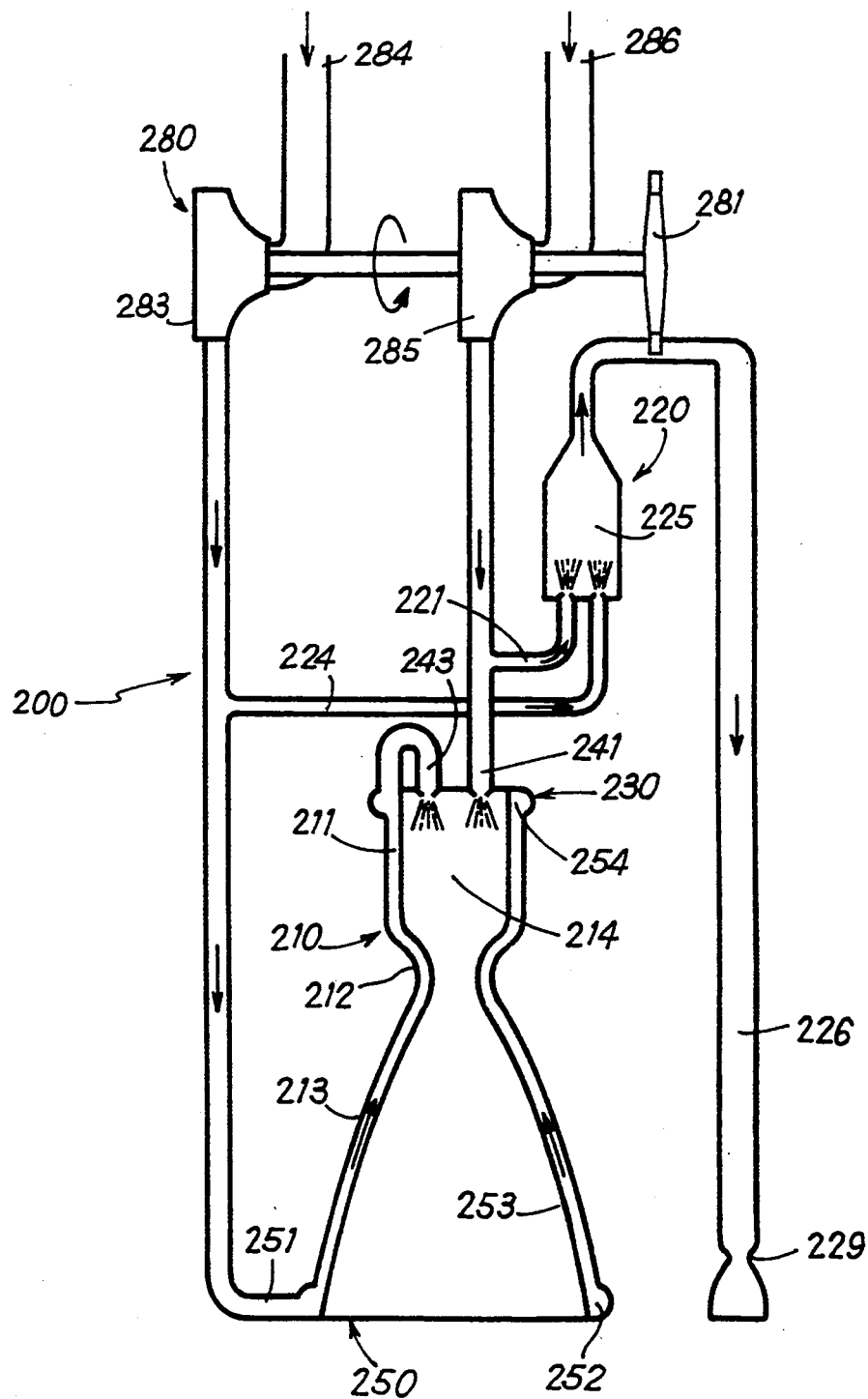

5,404,715

LIQUID PROPELLANT ROCKET ENGINE WITH PARALLEL AUXILIARY FLOW, AND AN INTEGRATED GAS GENERATOR

FIELD OF THE INVENTION

The invention relates to a liquid propellant rocket engine with parallel auxiliary flow, the engine comprising a combustion chamber defined by a main wall, an injection device for injecting first and second propellant components into the combustion chamber, at least one turbopump for feeding the injection device with the first and second propellant components under determined pressure, and a gas generator for driving at least one turbine of said turbopump.

PRIOR ART

Liquid propellent rocket engines are already known, in particular from Document U.S. Pat. No. 3,413,810, in which the engine is constituted by an integrated assembly comprising a turbopump mounted directly on a combustion chamber and itself comprising a turbine driven by the gases produced in an annular chamber specific thereto situated above the injection plate.

Under such circumstances, the fact that the auxiliary combustion chamber is offset axially upstream from the injection plate of the main combustion chamber, prevents maximum compactness being obtained and hinders the installation of external members above the main chamber, e.g. a gimbals device as is required when the main combustion chamber is to be steerable.

Document FR-A-2 636 376 discloses so-called "tap-off" systems where hot gases are tapped off from the main combustion chamber of a rocket engine through its injection plate. Under such circumstances, there is no independent gas generator and the only propellant injectors implemented are injectors disposed in the injection plate. However, for tapping it is necessary to use special pitot tubes which are cooled by propellant and which are interposed between the injectors in the injection plate. A drawback of such hot gas tap-off systems lies in the fact that the composition of the propellant mixture in the main chamber is necessarily adapted to rocket engine requirements, and as a result it is not possible to tap off hot gases in a state that is adapted to the desired utilization.

OBJECTS AND BRIEF SUMMARY OF THE INVENTION

The present invention seeks to remedy the above-mentioned drawback and to enable a liquid propellant rocket engine to be made that is very short in the axial direction, thereby making it easier to mount the assembly and reducing manufacturing costs, and that also makes it possible to adjust the propellant mixture independently for the production of hot gases that are used outside the main combustion chamber for driving auxiliary members such as a turbopump.

These objects are achieved by a liquid propellant rocket engine with parallel auxiliary flow, comprising a combustion chamber defined by a main wall, an injection device for injecting first and second propellant components into the combustion chamber, at least one turbopump for feeding the injection device with the first and second propellant components under determined pressure, and a gas generator for driving at least one turbine of said turbopump, wherein said injection device comprises a single injection plate including a central portion that defines the end of the burn zone of the combustion chamber and that contains first propellant injectors having a high mixing ratio adapted to the conditions of hot gas production in the burn zone of the combustion chamber, and a peripheral portion in the form of a ring that defines the end of an annular cavity of the gas generator and that contains second propellant injectors having a low mixing ratio adapted to the conditions of hot gas production in the gas generator, said gas generator thus being integrated in the combustion chamber with the annular cavity of the gas generator being separated from the burn zone of the combustion chamber by a cylindrical wall extending in an axial direction perpendicular to the injection plate and fixed to the injection plate in sealed manner.

Integrating the gas generator in the main chamber increases the compactness of the assembly while also making it simple, for example, to mount a gimbals device above the injection plate to enable the main chamber to be steered.

Above all, integrating injectors of different types in a single injection plate makes it possible, in spite of the simplicity of the mounting, to conserve maximum flexibility for adapting propellant mixture conditions to optimum operating conditions both within the main combustion chamber and within the annular gas-generating cavity.

In a first embodiment, the cylindrical wall is constituted directly by the upstream portion of the main wall of the combustion chamber situated in the vicinity of the injection plate, said upstream portion of the wall of the combustion chamber being connected in sealed manner to the injection plate in an intermediate zone between said central portion and said peripheral portion.

In this case, the gas generator may comprise a torus for evacuating the hot gases produced in the annular cavity defined between said upstream portion of the main wall and an outer cylindrical partition attached in sealed manner to the injection plate in an outer zone of the peripheral portion.

The fact that the gas generator is entirely outside the combustion chamber whose wall is connected in sealed manner to the injection plate makes it possible to have very low pressure in the gas generator which is entirely independent of the main chamber. In such an embodiment, the main wall of the combustion chamber is advantageously cooled in regenerative manner by circulating a small flow rate of one of the first and second propellant components along through channels formed in said main wall.

In a second possible embodiment, the cylindrical wall is constituted by a cylindrical partition disposed inside a volume defined by the main wall of the combustion chamber and having its upstream end connected in sealed manner to the injection plate in an intermediate zone between the central portion and said peripheral portion, the main wall of the combustion chamber itself being connected in sealed manner to the injection plate in an outer zone of the peripheral portion, and through passages being provided between said main wall and the partition in the downstream portion thereof.

More particularly, the downstream portion of the cylindrical partition is connected to the main wall of the combustion chamber by spacers pierced by orifices.

In the second embodiment, the gas generator may include a radial tapping point formed through the main wall of the combustion chamber to exhaust the hot gases produced in the annular cavity defined between said cylindrical partition and the main wall of the combustion chamber.

Advantageously, the cylindrical partition is cooled by causing a film of one of the propellant components that is injected into the burn zone to circulate along said cylindrical partition, adjacent to said burn zone.

The second embodiment corresponds to maximum integration of the gas generator which is situated between the outer wall of the main combustion chamber and an uninterrupted inner cylindrical wall at a certain distance beneath the injection plate and situated at a distance from the outer wall for delimiting a central portion that constitutes the burn zone of the combustion chamber proper, and a peripheral annular portion constituting the gas generator.

The injection device may comprise first and second distribution chambers respectively fed with first and second propellant components and disposed between an outer wall and the injection plate and separated from each other by a partition, a first series of injection tubes for the first propellant component running from said first distribution chamber and passing through the second distribution chamber and the central portion of the injection plate, and a second series of injection tubes for the second propellant component running from said second distribution chamber and passing through said central portion of the injection plate.

In this case, the rocket engine may include a torus for feeding the second fuel component, which torus surrounds the peripheral portion of the injection plate and serves to feed the second distribution chamber via radial channels formed through the peripheral portion of the injection plate.

More particularly, the rocket engine may include injection channels for injecting the first propellant component, which channels run from the first distribution chamber and pass through the peripheral portion of the injection plate to feed the annular cavity of the gas generator.

In addition, the rocket engine may include injection channels for injecting the second propellant component, which channels are formed in the peripheral portion of the injection plate, are fed from a second torus for feeding the second propellant component and surrounding the peripheral portion of the injection plate, and open out into the annular cavity of the gas generator.

Advantageously, the injection tubes for injecting the first and second propellent components and passing through the central portion of the injection plate open out coaxially in the burn zone of the combustion chamber.

Similarly, the injection channels for injecting the first and second propellent components and passing through the peripheral portion of the injection plate open out in coaxial manner in the annular cavity of the gas generator.

To simplify implementation, the peripheral portion of the injection plate may extend upstream beyond the central portion of the injection plate so as to constitute the peripheral side wall of the first and second propellant distribution chambers.

By way of example, the first propellant injectors having a high mixing ratio are adapted to producing hot gases at a temperature of about 3,000K in the burn zone of the combustion chamber, whereas the second propellant injectors having a low mixing ratio are adapted to the production of hot gases at a temperature of about 900K in the annular cavity of the gas generator.

BRIEF DESCRIPTION OF THE DRAWINGS

Other characteristics and advantages of the invention appear from the following description of particular embodiments, given by way of example, and made with reference to the accompanying drawings, in which:

FIG. 1 is an axial section view through the combustion chamber of a rocket engine having an integrated gas generator, constituting a first embodiment of the invention;

FIG. 2 is a section view on line II of FIG. 1;

FIG. 3 is a detail view in section on line III—III of FIG. 1 showing an example of the individual propellant injection device suitable for use in the context of the present invention;

FIG. 6 is a diagrammatic overall view of a liquid propellant rocket engine with parallel auxiliary flow to which the invention applies.

DETAILED DESCRIPTION OF PARTICULAR EMBODIMENTS

Figure 4:
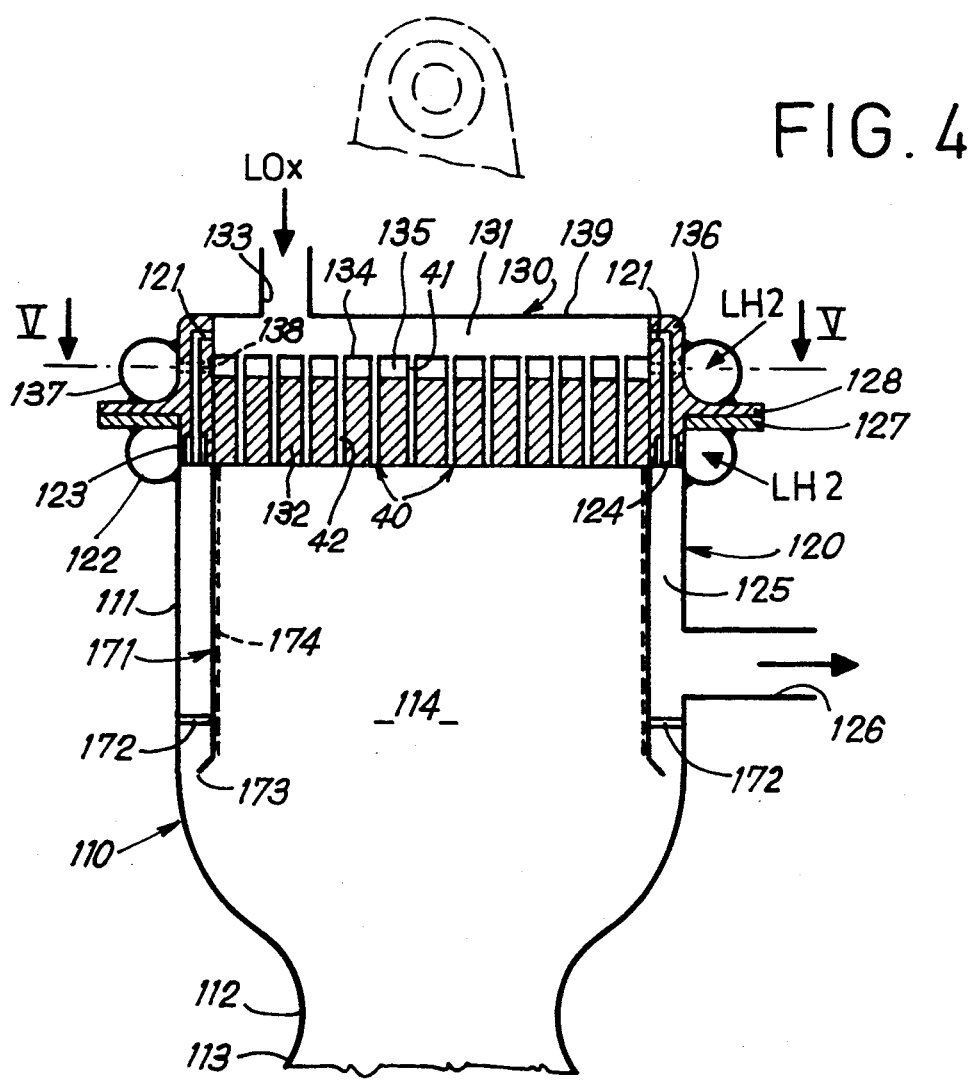
FIG. 4 is an axial section through the combustion chamber of a rocket engine having an integrated gas generator and constituting a second embodiment of the invention.

In general, liquid propellant rocket engines operate either with a direct auxiliary flow cycle or else with a parallel auxiliary flow cycle.

Direct flow rocket engines have an auxiliary first combustion chamber that is distinct from the main combustion chamber. The hot gases produced at the outlet from the first chamber have a high flow rate and they are reinjected into the main combustion chamber after being allowed to expand a little through the turbine of a propellant feed turbopump. Such a direct flow cycle provides good efficiency, but it leads to embodiments that are very expensive to develop and manufacture.

Rocket engines with parallel auxiliary flow as shown diagrammatically in FIG. 6 are much more flexible with respect to design and manufacture, and they are consequently much more widespread. Nevertheless, existing embodiments generally suffer from being bulky.

The overall principles of a liquid propellant rocket engine with parallel auxiliary flow to which the present invention applies are described with reference to FIG. 6.

The combustion chamber 210 thrust chamber of a rocket engine 200 having parallel auxiliary flow comprises, in conventional manner, a cylindrical wall 211 which defines an internal space 214 constituting a combustion chamber proper or burn zone and is extended downstream from the combustion chamber 214 by a narrowed portion 212 forming the throat of a nozzle whose diverging portion is essentially conical or bell-shaped. The propellant constituted by a fuel and an oxidizer is stored in tanks above the combustion chamber 210. It is delivered via respective pipes 284 and 286 under drive from respective pumps 283 and 285, and is fed via respective ducts 251, 243, and 241 to a device 230 for injecting the propellant into the burn zone 214 of the combustion chamber 210.

An independent gas generator 220 comprising a combustion enclosure 225 is fed with fuel and oxidizer via respective ducts 221 and 224 that branch off from the outlets of the pumps 283 and 285 respectively and that serve to draw off fractions from the main flows travelling along the main pipes 241 and 251 feeding the injection device 230 with fuel and oxidizer respectively. The hot gases from the gas generator 220 serve to drive a turbine 281 of the turbopump assembly 280 that feeds the main combustion chamber 210 and the gas generator 220 with propellant. After expanding greatly in the turbine 281, the hot gases from the gas generator 220 are exhausted via a separate duct 226 whose downstream end terminates in a small nozzle 229 that opens out into the ambient environment.

The combustion chamber 210 and the nozzle 212, 213 that extends it are often provided with a double wall defining through channels 253 enabling one of the propellant components, e.g. the fuel, to flow along the channels 253 prior to being injected into the combustion chamber 210 by the injection device 230. A regenerative circuit 250 is thus established that comprises, for example, a torus 252 for distributing the cooling propellant component which may be situated at the downstream end of the diverging portion 213 of the nozzle, or halfway therealong, and which receives the propellant component conveyed by the duct 251. The channels 253 are fed with propellant component from the distribution torus 252 and they lead to a collecting torus 254 itself located in the vicinity of the injection device 230, with the heated component in the collecting torus 254 itself being applied to the injection device 230 via a pipe 243.

Unlike a direct flow rocket engine, an auxiliary flow rocket engine enables its various components such as the gas generator and the main combustion chamber to be developed independently since the gases from the gas generator are not reinjected into the main combustion chamber. Nevertheless, existing embodiments necessarily lead to bulk that can often be excessive, and the provision of totally separate injection and combustion chamber assemblies for the gas generator 220 and for the main combustion chamber 210 increases cost.

FIG. 1 shows a first embodiment of the invention, enabling a parallel auxiliary flow rocket engine to be obtained that operates in the manner described above with reference to FIG. 6, but of a structure that is both more compact and cheaper while still enabling the general configuration of the rocket engine to be improved.

Thus, FIG. 1 shows a gas generator 20 surrounding the combustion chamber 10 of a rocket engine and comprising an annular cavity 25 coaxial with the burn zone 14 of the combustion chamber 10 and separated therefrom solely by the upstream portion 11 of the main wall of the combustion chamber.

The wall 11 of the combustion chamber 10 extends downstream in the form of a converging portion defining a throat 12 followed by a diverging portion 13 which may constitute the entire diverging portion of the rocket engine nozzle, or which may be of relatively short length, as shown in FIG. 1, and being provided with a coupling element such as a flange 15 onto which a separate diverging portion is mounted to extend the diverging portion 13.

FIG. 1 shows a system for cooling the wall of the combustion chamber 10 that constitutes a regenerative circuit 50 that may be of conventional design. The propellant component used for cooling is taken from a tank by means of a turbopump such as the turbopump 280 of FIG. 6, and is delivered by a pipe 51 to a distribution torus 52 placed in the vicinity of the flange 15 and from which channels or tubes 53 run that are distributed over the entire periphery of the combustion chamber 10 and that extend along the entire length of the wall 11, 12, 13 of the combustion chamber 10 to the vicinity of the propellant injection device 30 where they open out into a distribution chamber 35.

The injection device 30 comprises a single injection plate having the top portion of the wall 11 of the combustion chamber 10 passing therethrough in sealed manner. Only the channels or tubes 53 open out into the chamber 35 situated immediately above the injection plate. The single injection plate (FIGS. 1 and 2) comprises a central portion 32 which defines the end of the burn zone 14 of the combustion chamber 10 and a peripheral portion 36 in the form of a ring which defines the end of the annular cavity 25 of the gas generator 20. The central portion 32 contains first propellant injectors 40 having a high mixing ratio and adapted to the conditions under which hot gases are produced in the burn zone 14, whereas the peripheral portion 36 contains second propellant injectors 21, 24 having a low mixing ratio that are adapted to the conditions under which hot gases are produced in the gas generator 20. Thus, with a single injection plate, by having injectors of different types in the burn zone 14 and in the annular cavity 25 of the gas generator 20 which is separated from the burn zone 14 of the combustion chamber 10 by the cylindrical wall 11 that extends in the axial direction perpendicular from the injection plate, it is possible to adjust the propellant mixture conditions for the burn zone 14 and for the gas generator 20 independently in spite of the compactness of the assembly.

The annular cavity 25 of the gas generator 20 is defined firstly on the inside by the wall 11 of the combustion chamber and secondly on the outside by an outer cylindrical wall 27 that is connected in sealed manner to the injection plate in an outside zone of the peripheral portion 36. The hot gases produced in the annular cavity 25 can be collected by a torus 26 for exhausting to a load such as the turbine 281 of FIG. 6.

As can be seen in FIG. 1, a distribution chamber 31 in which one of the propellant components, e.g. the oxidizer, is injected under pressure from a pipe 33, is situated above the distribution chamber 35 and is separated therefrom by a partition 34. The top of the distribution chamber 31 is defined by an outer wall 39 that is connected to the peripheral portion 36 of the injection plate which extends beyond the central portion 32 in order to constitute the peripheral side wall of the propellant distribution chambers 31 and 35.

As can be seen in FIGS. 1 and 2, the distribution chamber 35 is fed with fuel firstly from the tubes 53 that lead to the distribution chamber 35 in the zone separating the central portion 32 from the peripheral portion 36 of the injection plate, and secondly from radial channels 38 formed in the peripheral portion 36 of the injection plate and serving to insert fuel under pressure from a torus 37 that surrounds the peripheral portion 36 of the injection plate and that receives the fuel directly from a tank via a turbopump. The distribution chamber 35 can thus simultaneously receive via the tubes 53 a certain quantity of propellant that has already served to cool the wall of the combustion chamber 10, and via the channels 38, another quantity of propellant under pressure coming directly from a storage tank. Nevertheless, the invention is equally applicable to the case where the distribution chamber 35 is fed solely by one or other of the feed means constituted by the tubes 53 and by the channels 38.

In the embodiment of FIGS. 1 and 2, first oxidizer injection tubes 41 run from the distribution chamber 31, e.g. through the partition 34 separating the distribution chambers 31 and 35, and pass through the distribution chamber 35 and the central portion 32 of the injection plate such that a predetermined flow rate of oxidizer taken from the distribution chamber 31 is injected into the burn zone 14.

Second fuel injection tubes 42 run from the distribution chamber 35 and pass through the central portion 32 of the injection plate. Advantageously, the injection tubes 41 and 42 are implemented so as to open out coaxially into the burn zone 14 of the combustion chamber.

As shown in FIG. 3, a coaxial injector 40 may comprise an outer tube 42 co-operating with an inner tube 41 to define an annular fuel feed channel while the inner tube 41 serves for injecting oxidizer. As can be seen in FIG. 3, the outer tube 42 may extend into the distribution chamber 35, providing radial holes 43 are formed through said outer tube so as to enable fuel from the distribution chamber 35 to penetrate into the annular channel defined by the tubes 42 and 43.

The annular cavity 25 of the gas generator 20 may itself be fed with oxidizer from the distribution chamber 31 via channels 21 that run from the distribution chamber 31 and that pass through the peripheral portion 36 of the injection plate.

Channels 24 that may be coaxial with the channels 21 as in the case of the injector 40, and that open out into the annular cavity 25 of the gas generator 20 are likewise formed in the peripheral portion 36 of the injection plate so as to inject oxidizer into the annular cavity 25. The channels 24 may be fed from the pressurized distribution torus 37 via a pipe 59 (FIG. 2). However, and as shown in FIG. 1, a second fuel feed torus 22 may be disposed beneath the first torus 37, and may be separated therefrom merely by assembly flanges 28 and 27a, so that it likewise surrounds the peripheral portion 36 of the injection plate in the vicinity of the annular cavity 25 so as to enable the channels 24 to be fed directly from the second torus 22 via radial channels 23.

By way of example, the high mixing rate propellant injectors 40 disposed in the central portion 32 of the injection plate may be adapted to producing hot gases at a temperature of about 3,000K whereas the low mixing rate propellant injectors 21 and 24 disposed in the peripheral portion 36 of the injection plate may be adapted to producing hot gases at much lower temperatures of about 900K to 1,000K.

In the above, it has been assumed that the oxidizer, e.g. liquid oxygen (LOx) is inserted into the distribution chamber 31 whereas the fuel, such as liquid hydrogen (LH$_2$) is inserted into the distribution chamber 35 via the tubes 53 and the torus 37, and is also inserted into the torus 22. Nevertheless, the two propellant components could be interchanged as a function of the application or of the natures of the propellant components, without the principles on which the present invention is based being modified. Similarly, the injectors 40 and 21, 24 could be implemented in numerous different ways, and the particular ways described above are not limiting.

It may be observed that an advantage of disposing the gas generator 20 concentrically around the combustion chamber 10 lies in the top wall 36 of the distribution chamber 31 being disengaged, thereby facilitating suspension, e.g. in a gimbals device 60, should it be necessary for the combustion chamber 10 of the rocket engine to be steerable.

A second particular embodiment of the invention is now described with reference to FIGS. 4 and 5.

In this second embodiment, elements that perform the same roles as elements in the first embodiment are given the same reference numerals plus a leading digit "1" and they are not described in detail again if they are identical or analogous in structure to the corresponding elements in the first embodiment of FIGS. 1 and 2.

Figure 5:
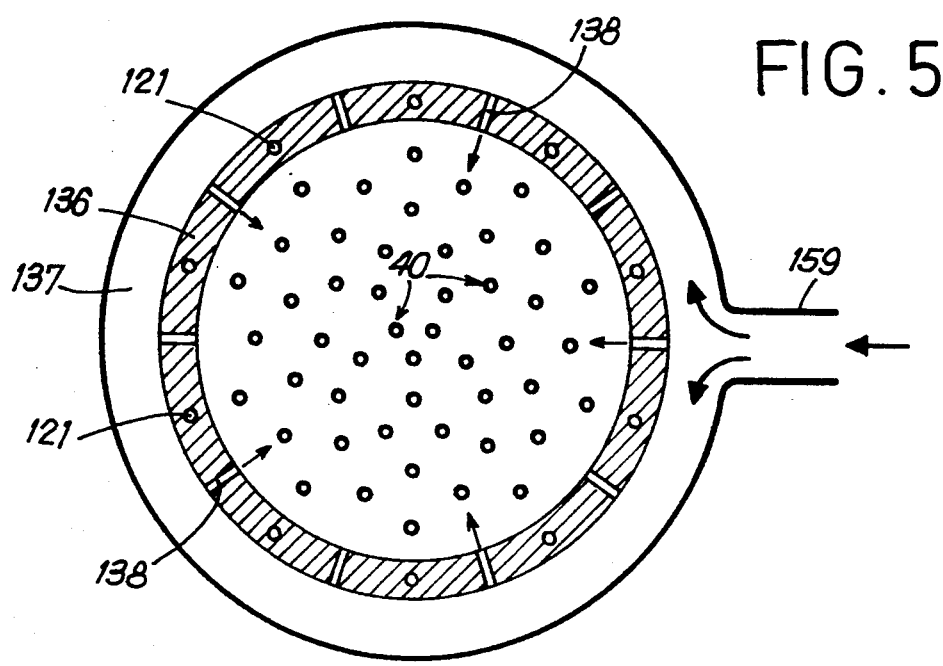
FIG. 5 is a section view on line V—V of FIG. 4.

The rocket engine of FIGS. 4 and 5 comprises a combustion chamber 110 which, as in FIGS. 1 and 2, is very closely associated with a gas generator 120 insofar as the annular cavity 125 of the gas generator 120 is concentric with the burn zone 114 and is separated therefrom by a single cylindrical wall 171 extending in the axial direction perpendicularly from a single injection plate 132, 136, and fixed thereto in sealed manner.

In the example shown in FIGS. 4 and 5, the cylindrical wall separating the burn zone 114 of the main combustion chamber 110 from the annular cavity 125 of the gas generator 120 is constituted by a single cylindrical partition 171 disposed inside the volume defined by the main wall 111 of the combustion chamber 110, and connected at its upstream end in sealed manner to the injection plate 132, 136 in an intermediate zone between the central portion 132 thereof and its peripheral portion 136. The main wall 111 of the combustion chamber is itself connected in sealed manner to the injection plate in an outer zone of its peripheral portion 136. Through passages are provided between the main wall 111 and the partition 171 in the downstream portion thereof.

As can be seen in FIG. 4, the downstream portion of the cylindrical portion 171 may be connected to the main wall 111 of the combustion chamber 110 by spacers 172 that are pierced by orifices 173.

The hot gases produced in the annular cavity 125 of the gas generator 120 defined between the cylindrical partition 171 and the main wall 111 may be exhausted through a radial tapping point 126 formed directly through the main wall 111 of the combustion chamber 110.

The injection device 130 of FIGS. 4 and 5 may be entirely similar to the injection device 30 of FIGS. 1 and 2, the partition 171 and the wall 111 acting respectively as the main wall 11 and the outer wall 27. The injectors 40 may be implemented in the manner shown in FIG. 3, for example.

FIGS. 4 and 5 do not show a system for cooling the main wall 111 of the combustion chamber 110, however a system of cooling channels analogous to the channels 53 of FIGS. 1 and 2 could be incorporated in the wall 111. The internal partition 171 may itself be cooled by causing a film 174 of one of the propellant components that is injected into the burn zone 114 to flow therealong in the burn zone 114. For example the fuel such as liquid hydrogen could be used for this purpose.

The cylindrical wall 171 which confines the hot gases for driving the turbines in the peripheral portion 125 of the combustion chamber around the burn zone 114 may be made of a composite material for example, or of an alloy such as Waspaloy, for example.

For the embodiment of FIGS. 1 or 2 or for the embodiment of FIGS. 4 and 5, it is possible to make an injection plate that is common to the combustion chamber 10 or 110 and to the gas generator 20 or 120, and which has a diameter of about 200 mm to 300 mm, for example, with the peripheral portion 36 or 136 itself extending axially over a height of about 20 mm to 30 mm. By way of example, 500 coaxial injectors 40 may be disposed in the central portion 32 or 132 of the injection plate, while about 60 coaxial injectors 21, 24 or 121, 124 may be disposed in the peripheral portion 36 or 136 of the injection plate.

As already mentioned, the injectors 40 for feeding the burn zone 14 or 114 of the combustion chamber 10 or 110 have a much greater mixing ratio than the injectors 21, 24 or 121, 124 that are designed to feed the annular cavity 25 or 125 of the gas chamber 20 or 120.

By way of example, when using a regenerative circuit such as the circuit 50 shown in FIG. 1, the injectors 40 may have a mixing ratio between the fuel and the oxidizer that is of the order of 5.5 (when the mixture is $O_2/H_2$), whereas the injectors 21, 24 or 121, 124 may have a mixing ratio between the fuel and the oxidizer that is of the order of 1 (when the mixture is $O_2/H_2$).

We claim:

1. A liquid propellant rocket engine with parallel auxiliary flow, the engine comprising a combustion chamber defined by a main wall, an injection device for injecting first and second propellant components into the combustion chamber, at least one turbopump for feeding the injection device with the first and second propellant components under determined pressure, and a gas generator for driving at least one turbine of said turbopump, wherein said injection device comprises a single injection plate including a central portion that defines the end of a burn zone of the combustion chamber and that contains first propellant injectors having a high mixing ratio adapted to the conditions of hot gas production in the burn zone of the combustion chamber, and a peripheral portion in the form of a ring that defines the end of an annular cavity of the gas generator and that contains second propellant injectors having a low mixing ratio adapted to the conditions of hot gas production in the gas generator, said gas generator thus being integrated in the combustion chamber with the annular cavity of the gas generator being separated from the burn zone of the combustion chamber by a cylindrical wall extending in an axial direction perpendicular to the injection plate and fixed to the injection plate in a sealed manner.

2. A rocket engine according to claim 1, wherein said cylindrical wall is constituted by an upstream portion of the main wall of the combustion chamber situated in the vicinity of the injection plate, said upstream portion of the main wall of the combustion chamber being connected in a sealed manner to the injection plate in an intermediate zone between said central portion and said peripheral portion.

3. A rocket engine according to claim 2, wherein the gas generator comprises a torus for evacuating the hot gases produced in the annular cavity defined between said upstream portion of the main wall and an outer cylindrical partition connected in a sealed manner to the injection plate in an outer zone of the peripheral portion.

4. A rocket engine according to claim 1, wherein said cylindrical wall is constituted by a cylindrical partition disposed inside a volume defined by the main wall of the combustion chamber and having its upstream end connected in a sealed manner to the injection plate in an intermediate zone between the central portion and said peripheral portion, the main wall of the combustion chamber itself being connected in sealed manner to the injection plate in an outer zone of the peripheral portion, and through passages being provided between said main wall and the partition in a downstream portion thereof.

5. A rocket engine according to claim 4, wherein the downstream portion of the cylindrical partition is connected to the main wall of the combustion chamber by spacers pierced by orifices.

6. A rocket engine according to claim 4, wherein the gas generator includes a radial tapping point formed through the main wall of the combustion chamber to exhaust the hot gases produced in the annular cavity defined between said cylindrical partition and the main wall of the combustion chamber.

7. A rocket engine according to claim 1, wherein said injection device comprises first and second distribution chambers respectively fed with first and second propellant components and disposed between an outer wall and the injection plate and separated from each other by a partition, a first series of injection tubes for the first propellent component running from said first distribution chamber and passing through the second distribution chamber and the central portion of the injection plate, and a second series of injection tubes for the second propellant component running from said second distribution chamber and passing through said central portion of the injection plate.

8. A rocket engine according to claim 7, including a torus for feeding the second fuel component, which torus surrounds the peripheral portion of the injection plate and serves to feed the second distribution chamber via radial channels formed through the peripheral portion of the injection plate.

9. A rocket engine according to claim 7, including injection channels for injecting the first propellant component, which channels run from the first distribution chamber and pass through the peripheral portion of the injection plate to feed the annular cavity of the gas generator.

10. A rocket engine according to claim 9, including injection channels for injecting the second propellant component, which channels are formed in the peripheral portion of the injection plate, are fed from a second torus for feeding the second propellant component and surrounding the peripheral portion of the injection plate, and open out into the annular cavity of the gas generator.

11. A rocket engine according to claim 7, wherein the injection tubes for injecting the first and second propellent components and passing through the central portion of the injection plate open out coaxially in the burn zone of the combustion chamber.

12. A rocket engine according to claim 10, wherein the injection channels for injecting the first and second propellent components and passing through the peripheral portion of the injection plate open out in coaxial manner in the annular cavity of the gas generator.

13. A rocket engine according to claim 7, wherein the peripheral portion of the injection plate extends upstream beyond the central portion of the injection plate so as to constitute a peripheral side wall of the first and second propellant distribution chambers.

14. A rocket engine according to claim 1, wherein the first propellant injectors having a high mixing ratio are adapted to producing hot gases at a temperature of about 3,000K in the burn zone of the combustion chamber, whereas the second propellant injectors having a low mixing ratio are adapted to the production of hot gases at a temperature of about 900K in the annular cavity of the gas generator.

15. A rocket engine according to claim 2, wherein the main wall of the combustion chamber is cooled in regenerative manner by circulating a flow of one of the first and second propellant components via through channels formed in said main wall.

16. A rocket engine according to claim 4, wherein said cylindrical partition is cooled by circulating a film of one of the propellant components injected into said burn zone along said cylindrical partition beside the burn zone.

* * * * *